US010812126B1

(12) United States Patent
Kerselaers et al.

(10) Patent No.: US 10,812,126 B1
(45) Date of Patent: Oct. 20, 2020

(54) NEAR-FIELD DEVICE INCLUDING MULTIPLE CONDUCTIVE PLATES

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/577,101

(22) Filed: Sep. 20, 2019

(51) Int. Cl.
| | |
|---|---|
| *H04B 1/38* | (2015.01) |
| *H04B 1/40* | (2015.01) |
| *H01Q 1/36* | (2006.01) |
| *H01Q 1/27* | (2006.01) |
| *H04B 1/3827* | (2015.01) |
| *H04B 5/00* | (2006.01) |
| *H04B 5/02* | (2006.01) |

(52) U.S. Cl.
CPC ........... *H04B 1/385* (2013.01); *H04B 5/0081* (2013.01); *H04B 5/02* (2013.01)

(58) Field of Classification Search
CPC .......... H04B 1/16; H04B 1/38; H04B 1/3827; H04B 1/385; H01Q 1/12; H01Q 1/24; H01Q 1/27; H01Q 1/273; H01Q 1/36
See application file for complete search history.

(56) References Cited

U.S. PATENT DOCUMENTS

| | | | | |
|---|---|---|---|---|
| 4,992,799 | A | | 2/1991 | Garay |
| 5,532,705 | A | * | 7/1996 | Hama ..................... H01Q 1/273 343/702 |
| 6,597,320 | B2 | * | 7/2003 | Maeda ................... H01Q 1/273 343/702 |
| 6,825,751 | B1 | * | 11/2004 | Kita ................. G06K 19/07762 340/10.52 |
| 9,563,836 | B2 | * | 2/2017 | Mei ................... G06K 19/07722 |
| 9,819,097 | B2 | | 11/2017 | Kerselaers et al. |
| 10,320,086 | B2 | | 6/2019 | Kerselaers et al. |
| 2010/0003917 | A1 | * | 1/2010 | Hebiguchi ........... H04B 13/005 455/41.1 |
| 2017/0222692 | A1 | * | 8/2017 | Huang ................... H04B 1/385 |
| 2020/0170514 | A1 | * | 6/2020 | Hui ...................... A61B 5/0507 |

OTHER PUBLICATIONS

U.S. Appl. No. 15/935,420; not yet published; 31 pages (filed Mar. 26, 2018).

* cited by examiner

*Primary Examiner* — Blane J Jackson

(57) ABSTRACT

One example discloses a near-field device, including: an electric (E-Field) antenna including a first conductive plate and a second conductive plate responsive to non-propagating quasi-static electric near-field signals; wherein the electric antenna is configured to be coupled to a transceiver circuit; a substrate configured to be worn by a user; wherein the first conductive plate is located on a first side of the substrate configured to face away from the user; and wherein the second conductive plate is located on a second side of the substrate configured to face toward the user.

20 Claims, 5 Drawing Sheets

NEAR-FIELD DEVICE INCLUDING MULTIPLE CONDUCTIVE PLATES

The present specification relates to systems, methods, apparatuses, devices, articles of manufacture and instructions for a near-field device.

SUMMARY

According to an example embodiment, a near-field device, comprising: an electric (E-Field) antenna including a first conductive plate and a second conductive plate responsive to non-propagating quasi-static electric near-field signals; wherein the electric antenna is configured to be coupled to a transceiver circuit; a substrate configured to be worn by a user; wherein the first conductive plate is located on a first side of the substrate configured to face away from the user; and wherein the second conductive plate is located on a second side of the substrate configured to face toward the user.

In another example embodiment, the substrate is configured to flexibly conform to the user (e.g. wrist or chest band).

In another example embodiment, the substrate is a fabric.

In another example embodiment, further comprising a third conductive plate and a fourth conductive plate; wherein the third conductive plate is located on the first side of the substrate; and wherein the fourth conductive plate is located on the second side of the substrate.

In another example embodiment, the first and third conductive plates are physically separated from, but electrically coupled to, each other; and the second and fourth conductive plates are physically separated from, but electrically coupled to, each other.

In another example embodiment, the first and second conductive plates and the third and fourth conductive plates are electrically coupled to add as capacitors in parallel.

In another example embodiment, the first and second conductive plates and the third and fourth conductive plates are substantially equidistantly distributed along the substrate from each other.

In another example embodiment, the substrate is configured to be a physically closed loop; and the first and second conductive plates and the third and fourth conductive plates are substantially equidistantly distributed radially around the closed loop formed by the substrate.

In another example embodiment, further comprising a fifth and sixth conductive plates and seventh and eighth conductive plates; wherein the substrate is configured to be a physically closed loop; and wherein the first and second, third and fourth, fifth and sixth, and seventh and eighth conductive plate pairs are individually located every 45 degrees around the closed loop formed by the substrate.

In another example embodiment, the transceiver circuit include a tuning circuit; and the tuning circuit is configured to set a resonance frequency and a bandwidth for the electric antenna.

In another example embodiment, the first and second conductive plates and the third and fourth conductive plates are coupled in parallel to the tuning circuit.

In another example embodiment, the first and second conductive plates and the third and fourth conductive plates are switchably coupled to the tuning circuit.

In another example embodiment, further comprising a switch matrix and a controller.

In another example embodiment, the controller is configured to command the switch matrix to selectively couple the conductive plates to the tuning circuit.

In another example embodiment, the controller is configured to command the switch matrix to select the conductive plates to be coupled to the tuning circuit to maximize a received signal strength (RSS) of the electric near-field signals.

In another example embodiment, the controller is configured to command the switch matrix to select just one set of the conductive plates to be coupled to the tuning circuit to maximize a received signal strength (RSS) of the electric near-field signals.

In another example embodiment, the electric (E-Field) antenna includes a plurality of conductive plate sets; the substrate includes a set of interlinked segments; and (e.g. chain-type wristwatch band) each conductive plate set in the plurality of conductive plate sets is coupled to just one of the segments.

In another example embodiment, further comprising a magnetic (H-Field) antenna including a coil responsive to non-propagating quasi-static magnetic near-field signals; wherein the magnetic antenna is configured to be coupled to the transceiver circuit.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1A:
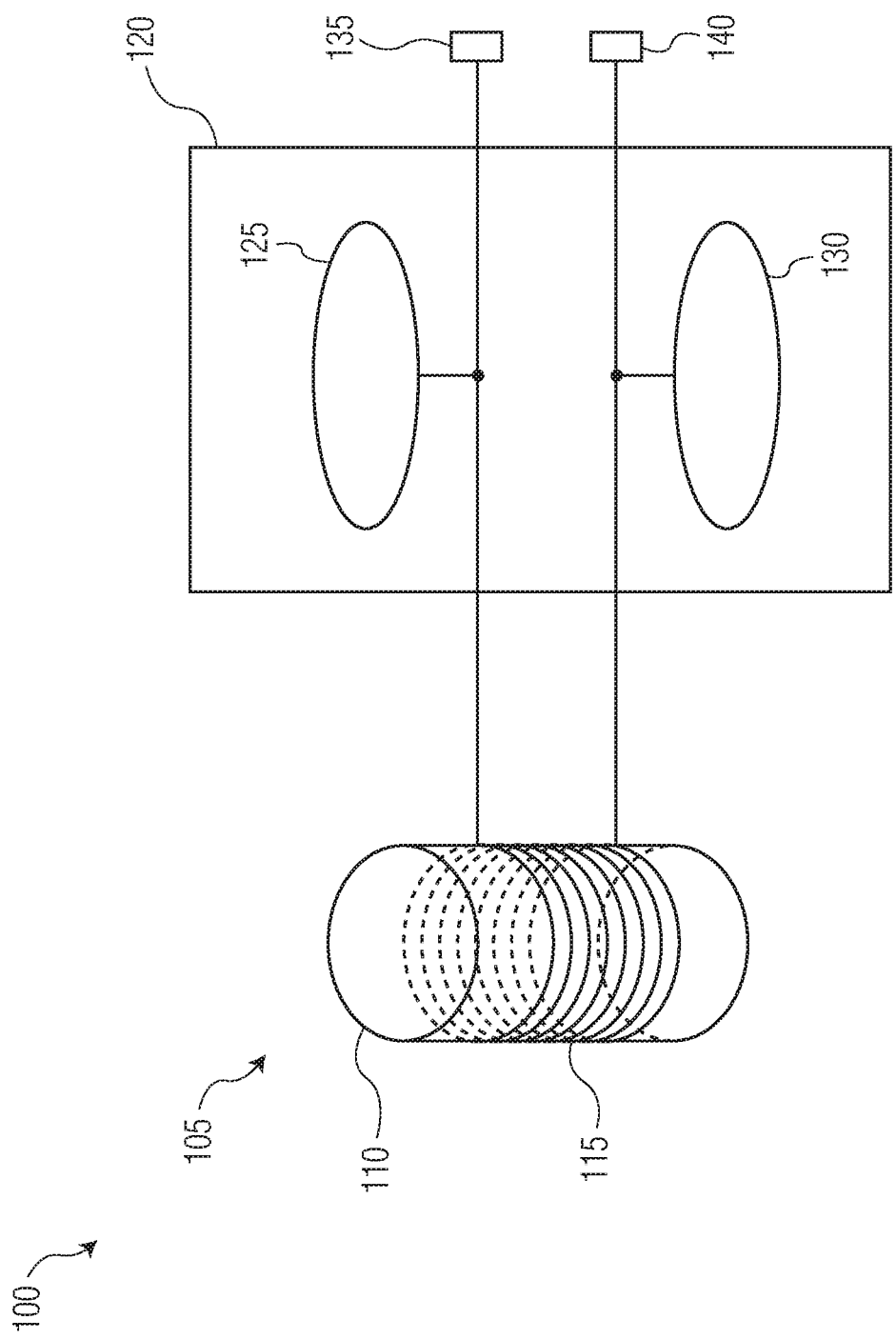
FIG. 1A is a first example near-field antenna.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are near-field interactions between a near-field device, perhaps on a user's body, and other conductive surfaces and/or other wireless networked devices (e.g. Internet of Things (IoT) devices) based on near-field electromagnetic induction (NFEMI), where the transmitter and receiver are coupled by both magnetic (H) and electric (E) fields. While RF wireless communication is accomplished by propagating an RF plane wave through free space, NFEMI communication utilizes non-propagating quasi-static H and E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Some wearables, such as hearing aids and wireless earbuds, employ Near-Field Magnetic Induction (NFMI) as a wireless communication method. In NFMI wireless communication, two loosely coupled coils realize signal transfer. No radiation of radio waves takes place. A current flowing in the transmission coil generates a H-field which in turn induces a current in the receiving coil. In this way, wireless communication is accomplished. Unfortunately, H-field based NFMI systems with small antenna coils have a limited range that may be much smaller than an entire wearable user's body. Such H-field communications are sensitive to coil orientation. In the case of a hearing aid form factor, a H-field induction based system cannot cover an entire human body. However, since in hearing aids both coils are always aligned with each other, they are not influenced by the movement of the human body.

Other wearables employ Near-field Electric Induction (NFEI)) as a wireless communication method. NFEI allows electronic devices on and near a conductive surface (e.g. a human body) to exchange information through E-field coupling (e.g. at 21 MHz). NFEI is also sometimes called Body Coupled Communication (BCC). While E-field based NFEI signals can have a greater range than H-field based NFMI signals, the E-field signal strength can vary with regard to body posture and is sensitive to body movements. The body can even partially block a capacitive return path, thereby increasing E-field channel loss and reliable and robust wireless communication is not possible.

FIG. 1A is an example near-field electromagnetic induction (NFEMI) antenna 100 for use in a wireless device. The antenna 100 in this example is an electromagnetic induction (NFEMI) antenna. In some example embodiments, the antenna 100 includes a magnetic (H-field) antenna 105 (e.g. small loop antenna) in conjunction with an electric (E-field) antenna 120 (e.g. short loaded dipole). The magnetic antenna 105 includes a ferrite core 110 wound with a wire coil 115. The electric (E-field) antenna 120 includes two loading plates 125 and 130. Antenna 100 feed points 135, 140 are coupled to various transceiver circuitry, such as downstream radio transmitter and receiver integrated circuit (RF-IC), (not shown here).

The electric (E-field) antenna 120 is responsive to an electric (E) field. The magnetic antenna portion 105 is responsive to a magnetic (H) field.

When the NFEMI antenna 100 is proximate to a body (e.g. a person, an object, etc.) the magnetic and electric fields will be substantially confined to the body and not significantly radiate in free-space. This enhances security and privacy of such body networked communications.

In various example embodiments, the antenna 100 operates at or below 50 MHz to ensure that the fields are following the body contours and to ensure that far field radiation is strongly reduced. The size of the magnetic antenna 105 and the transmit frequency are chosen to reduce any far field radiation that may be created by the magnetic antenna 105. For example, the size of the magnetic antenna 105 wire coil 115 can be 2 mm in diameter and 6 mm in length and the transmit frequency kept below 50 MHz.

Figure 1B:
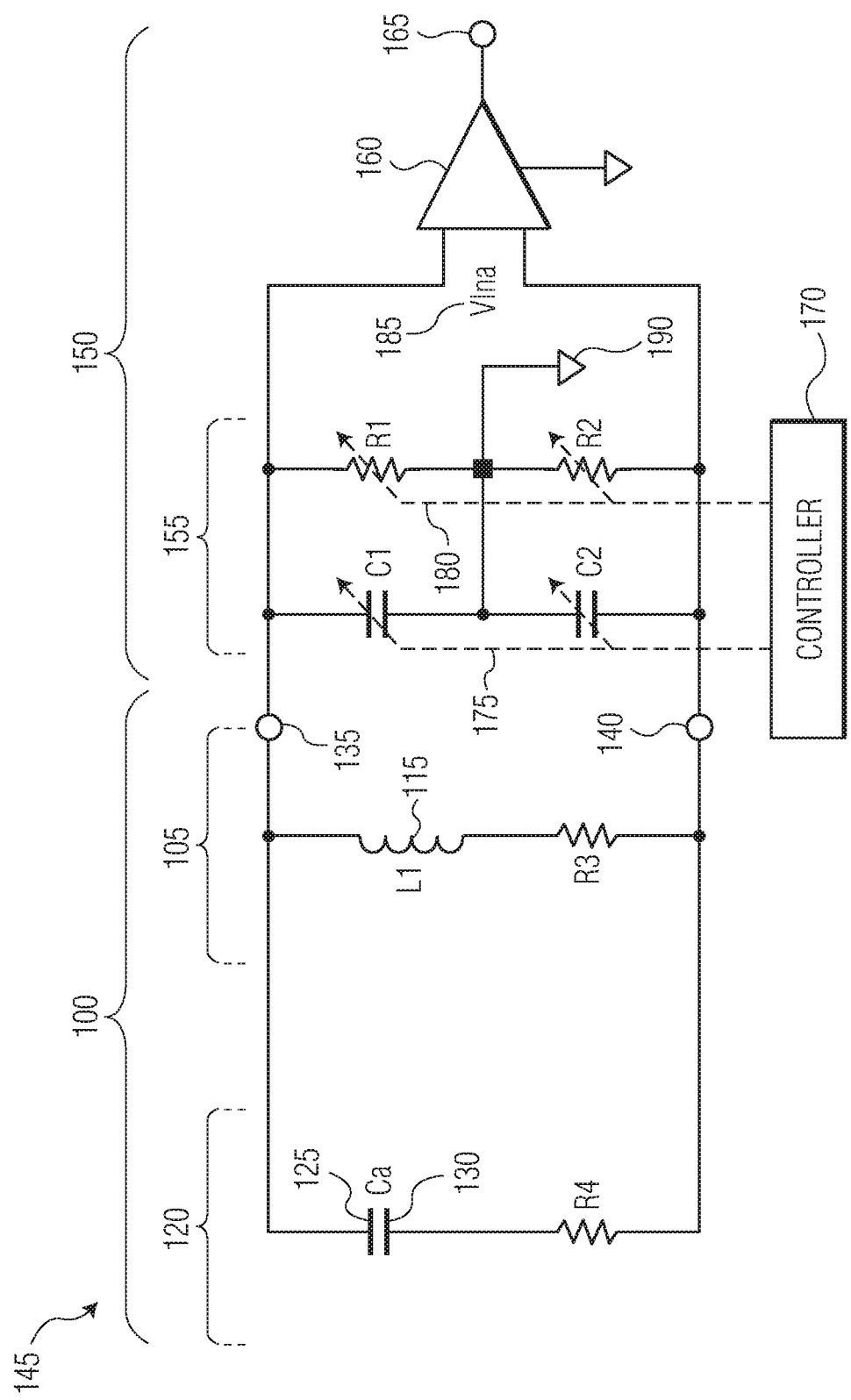
FIG. 1B is an example idealized electrical equivalent of a near-field device coupled to the near-field antenna and configured to receive a non-propagating quasi-static near-field signal.

FIG. 1B is an example idealized electrical equivalent of a near-field device 145 including the near-field antenna 100 and supporting circuits 150. The near-field device 145 is configured to receive (e.g. in a receive mode) a non-propagating quasi-static near-field signal. Note that the near-field antenna 100 may also be coupled to a transmitter circuit (not shown) for two-way communications.

The example idealized antenna 100 includes the magnetic (H-field) antenna 105 having a resistance (R3) and an inductance (L1), the electric (E-field) antenna 120 having a conductive structure formed from the two loading plates 125 and 130, and the two feeding points 135, 140.

The supporting circuits 150 include a tuning circuit 155, an LNA 160 (low noise amplifier), a communications signal interface 165, and a controller 170.

The tuning circuit 155 is coupled to the first and second feed points 135, 140. The tuning circuit 155 includes a first variable tuning capacitance bank (C1), a second variable tuning capacitance bank (C2), a first variable tuning resistance bank (R1), and a second variable tuning resistance bank (R2). The capacitance banks and resistance banks are coupled to a reference potential 190 (e.g. a ground potential). The capacitive banks are coupled to the controller 170 by control line 175, and the resistance banks are coupled to the controller 170 by control line 180.

The controller 170 adjusts the first and second capacitance banks (C1), (C2) to adjust a resonant frequency of the magnetic 105 and the electric 120 antennas (e.g. to 10.6 MHz). The controller 170 adjusts the first and second resistance banks (R1), (R2) to adjust a bandwidth of the magnetic 105 and the electric 120 antennas (e.g. to 400 KHz) sufficient to allow the non-propagating quasi-static near-field signal to be received from the antennas 105, 120.

The capacitance banks (C1), (C2) are equally tuned using the control line 175 from the controller 170, and the resistance banks (R1), (R2) are equally tuned using the control line 180 from the controller 170.

The LNA 160 is coupled between the tuning circuit 155 and a communications signal interface 165. When the near-field device 145 is receiving the non-propagating quasi-static near-field signal, induced voltage 185 (Vlna) is present across the LNA 160 differential inputs. The LNA 160 amplifies the received near-field signal which is then further processed by additional radio/RFIC/baseband circuits (not shown) coupled to the communications signal interface 165. The LNA 160 is also coupled to the reference potential 190.

Since both inputs to the LNA 160 are coupled to the antennas 105, 120 the near-field device's 145 configuration is said to be balanced. The balanced circuit configuration helps reject interference signals that enter both LNA 160 input lines with the same amplitude and phase. In other examples an unbalanced device can be used.

During operation a voltage is induced in the electric (E-field) antenna 120 by a received near-field electric signal. This voltage generates a current through the E-field antenna 120. The received voltage is defined by:

$$U = Q \frac{C_a}{C_a + C_t}.$$

where:
 U voltage at the LNA 160 input [Volts]
 Ca electric antenna 120 equivalent capacitance
 Ct Tuning capacitance (e.g. combination of C1 and C2)

Positioning of the electric (E-field) antenna 120 can have an effect on the near-field device's 145 ability to communicate using near-field electric signals with other near-field devices. For example, if the electric (E-field) antenna 120 is positioned facing a user's body then both conductive plates 125 and 130 may be partially or wholly covered by the user's conductive body surfaces, thereby degrading an ability of the near-field device 200, 202 to communicate using near-field electric signals with other near-field devices.

Now discussed is an example embodiment of a near-field device that optimally orients the electric (E-field) antenna 120 away from a user's body. In this example embodiment, the near-field device is embedded in a smartwatch to be worn on a user's left wrist. In this orientation one of the conductive plates 130 will face toward the user and the other conductive plate 125 will face away from the user, for better near-field electric signal communication.

Figure 2B:
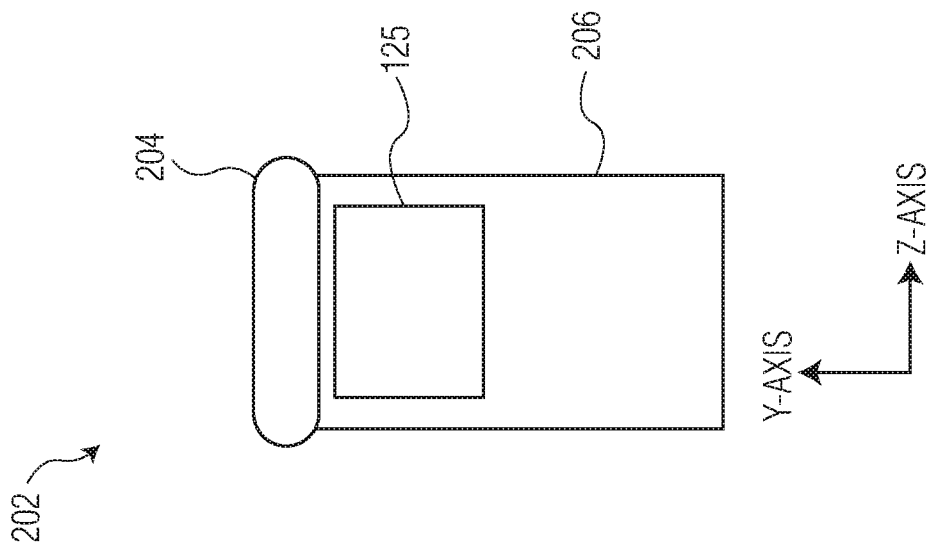
FIG. 2B is a second view of the first example near-field device.
Figure 2A:
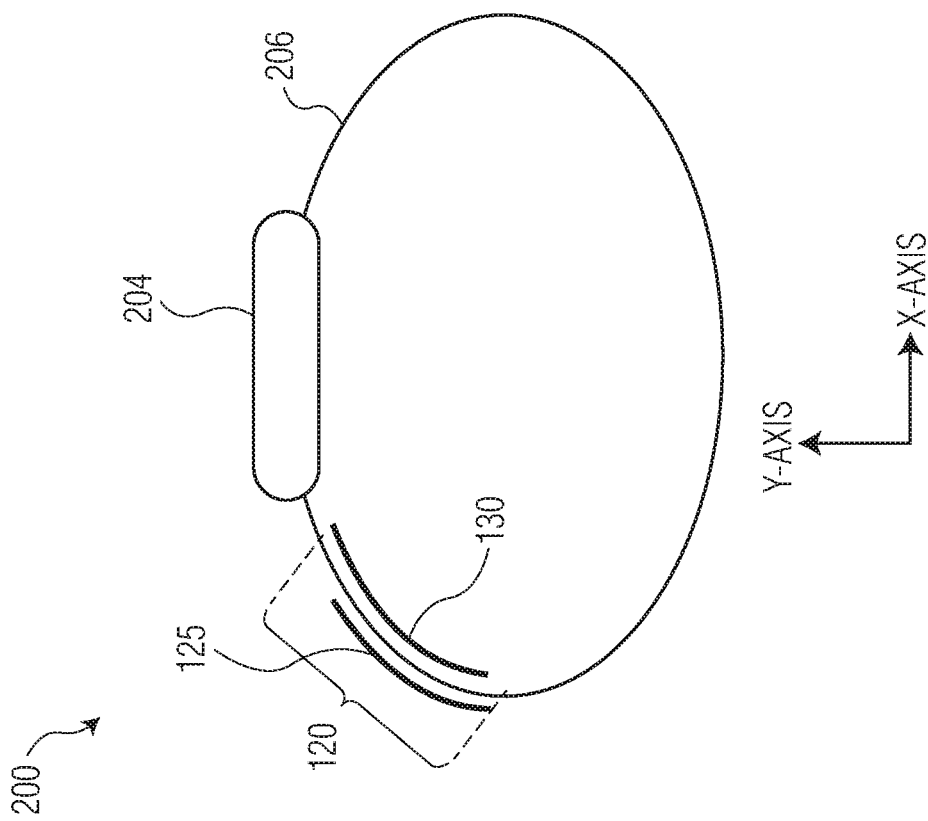
FIG. 2A is a first view of a first example near-field device.

FIG. 2A is a first view 200 of a first example near-field device. FIG. 2B is a second view 202 of the first example near-field device. The device 200, 202 includes a set of electronics 204 and a substrate attachment structure 206. In some example embodiments the device 200, 202 is wearable (e.g. smartwatch) and the substrate attachment structure 206 is a wrist-band, strap, tape, or embedded in clothing.

In some example embodiments the set of electronics 204 includes the magnetic (H-field) antenna 105 (optional) and various supporting circuits 150 (e.g. tuning circuit, receiver, transmitter, baseband data processing, etc.).

Shown in this example, the substrate 206 hosts the electric (E-field) antenna 120 having two conductive plates 125, 130 responsive to near-field electric signals. The first conductive plate 125 is located on a first side of the substrate configured to face away from the user. The second conductive plate 130 is located on a second side of the substrate configured to face toward the user. In some example embodiments the substrate 206 is configured to flexibly conform to the user (e.g. wrist-band for a smartwatch, chest-band for a medical monitor, fabric, etc.).

Once a smartwatch, embodying the near-field device 200, 202, is on the left wrist of a person and the user's arms are aside their body, the first conducting surface 105 is facing away from the user's body parts and good antenna efficiency is obtained. However, if the smartwatch is on the right arm of the user, the first conductive surface 105 will face an upper part of the user's leg and the efficiency of the antenna is reduced.

Two different mechanisms in this situation have impact on the antenna efficiency, namely in transmit mode, the electric field is locked-up between the arm and the upper leg and reduced electric field is distributed along the body. Secondly a quality factor of the antenna circuit will be reduced since biological material (e.g. the user) is close to both antenna surfaces and forms a virtual impedance across them. In some cases the receive sensitivity will drop substantially since the quality factor cannot be adjusted anymore with the variable tuning resistance banks.

Thus in some example embodiments, a problem with the near-field device 200, 202, however, is when the single E-field antenna 120, perhaps worn at a user's wrist in a smartwatch, is brought close to the user's body. During such an operation, both conductive plates 125 and 130 are partially or wholly covered by the user's conductive body surfaces, thereby degrading an ability of the near-field device 200, 202 to communicate using near-field electric signals with other near-field devices.

This degradation may happen statically or dynamically at various times as the user moves. Changing a location of the near-field device 220, 202 on the user's body is often not a solution since the location is usually dictated by the application (e.g. a smartwatch is worn on the wrist).

Now discussed are other example embodiments of a near-field device having an electric antenna with multiple sets of conductive plates 125, 130 each positioned at a different angles with respect to each other and at distinct locations along a substrate attachment structure with the conductive plates 125, 130 perpendicular to electric field vectors on a user's body from near-field electric signals, so that at least one set of conductive plates 125, 130 is optimally coupled to receive and transmit near-field electric signals.

Figure 3:
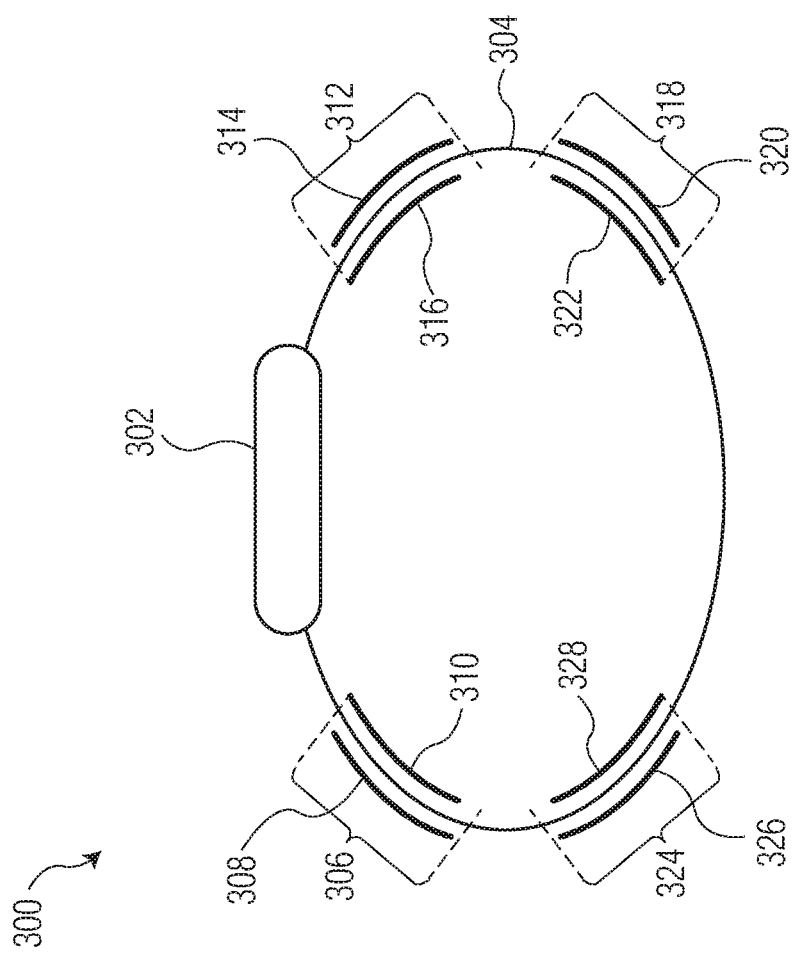
FIG. 3 is a second example near-field device.

FIG. 3 is a second example near-field device 300. The second example near-field device 300 includes a set of electronics 302 (e.g. smartwatch), including a magnetic (H-field) antenna 105 (optional) and supporting circuits 150. The near-field device 300 also includes a substrate attachment structure 304 (e.g. wrist-band, strap, tape, etc.), a first electric (E-field) antenna 306 (having two loading plates 308 and 310), a second electric (E-field) antenna 312 (having two loading plates 314 and 316), a third electric (E-field) antenna 318 (having two loading plates 320 and 322), and a fourth electric (E-field) antenna 324 (having two loading plates 326 and 328).

An inner set of conductive plates 310, 316, 322, 328 are is some example embodiments are facing toward and coupled to a user's skin and an outer set of conductive plates 308, 314, 320, 326 are facing away from the user's skin and coupled to the environment.

Figure 4:
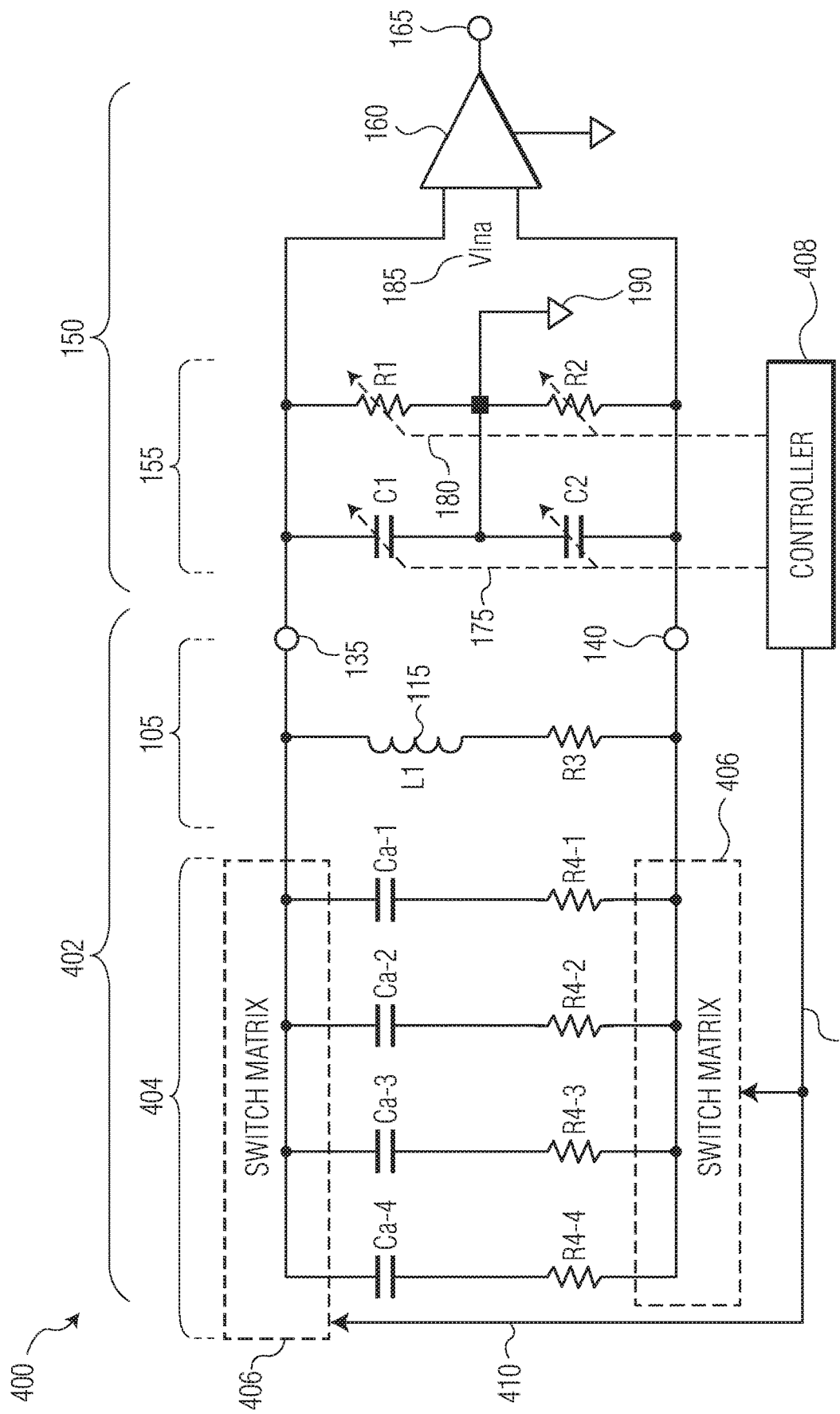
FIG. 4 is an example idealized electrical equivalent of the second example near-field device.

The conductive plates are physically separated from, but electrically coupled to, each other (see FIG. 4). The conductive plates are configured to add as capacitors in parallel, further boosting the received near-field electric signal's strength (i.e. RSS (Received Signal Strength)) and transmitting the electric near-field according to the TSS (Transmit Signal Strength)).

The conductive plates in various example embodiments are located along, around, etc. the substrate attachment structure 304 in various geometries depending upon an application. In one example embodiment, the conductive plates are substantially equidistantly distributed along the substrate 304 from each other. In other example embodiments, the substrate 304 is configured to be a physically closed loop (e.g. like the wrist-band shown in FIG. 3) and the conductive plates are substantially equidistantly distributed radially around the closed loop formed by the substrate (e.g. perhaps individually located every 45 degrees around the closed loop).

In one example embodiment, the electric (E-Field) antenna assembly 306, 312, 318, 324 includes a plurality of conductive plate sets and the substrate includes a set of interlinked segments (e.g. perhaps like a chain-type wristwatch band), where each conductive plate set in the plurality of conductive plate sets is coupled to just one of the interlinked segments.

The electric (E-Field) antennas 306, 312, 318, 324 need not be evenly (i.e. equidistantly) distributed along or around the substrate 304. Instead, the electric (E-Field) antennas 306, 312, 318, 324 can be asymmetrically positioned so as to maximize and/or optimize near-field received and/or transmitted signal strength.

Due to the multiple sets of conductive plates, smartwatches embodying the second example near-field device 300 can be positioned on either the left or right arm of a user, and at least one set of conductive plates will have a much greater chance of not being blocked by the user's body and thus better coupled to the environment for a more robust near-field electric communications link.

Thus when one antenna section becomes "locked up" by biological material (e.g. the user's body), the quality factor can still be aligned since the decrease in quality factor depends on the surface area that is "locked up". Since each antenna section is located perpendicular to the electric field vector on the human body at distinct locations under an angle with each other not all antenna sections are likely to be "locked up" together.

FIG. 4 is an example 400 idealized electrical equivalent of the second example near-field device 300. This example 400 electrical equivalent is similar to that discussed in FIG. 1B, but with at least the following differences.

The example near-field device 400 includes a modified near-field antenna 402 wherein an electric (E-field) antenna 404 portion now has four sets of conductive plates coupled in parallel and represented by capacitance (Ca-1), resistance (R4-1), capacitance (Ca-2), resistance (R4-2), capacitance (Ca-3), resistance (R4-3), capacitance (Ca-4), and resistance (R4-4).

Some example embodiments include a switch matrix 406 and a modified controller 408 having an extra control line 410 for controlling the switch matrix 406. Thus the sets of conductive plates can be selectively, switchably, and variably coupled to the tuning circuit 155.

The controller 408 can command the switch matrix 406 to select set of conductive plates or individual portions of each conductive plate set to be coupled to the tuning circuit 155 so as to optimize, maximize, etc. a received and/or transmitted signal strength of the electric near-field signals.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and

What is claimed is:

1. A near-field device, comprising:
an electric (E-Field) antenna including a first conductive plate and a second conductive plate responsive to non-propagating quasi-static electric near-field signals;
wherein the electric antenna is configured to be coupled to a transceiver circuit;
a substrate configured to be worn by a user;
wherein the first conductive plate is located on a first side of the substrate configured to face away from the user; and
wherein the second conductive plate is located on a second side of the substrate configured to face toward the user
further comprising a third conductive plate and a fourth conductive plate;
wherein the third conductive plate is located on the first side of the substrate; and
wherein the fourth conductive plate is located on the second side of the substrate.

2. The device of claim 1:
wherein the substrate is configured to flexibly conform to the user.

3. The device of claim 2:
wherein the substrate is a fabric.

4. The device of claim 1:
wherein the first and third conductive plates are physically separated from, but electrically coupled to, each other; and
wherein the second and fourth conductive plates are physically separated from, but electrically coupled to, each other.

5. The device of claim 1:
wherein the first and second conductive plates and the third and fourth conductive plates are electrically coupled to add as capacitors in parallel.

6. The device of claim 1:
wherein the first and second conductive plates and the third and fourth conductive plates are substantially equidistantly distributed along the substrate from each other.

7. The device of claim 1:
wherein the substrate is configured to be a physically closed loop; and
wherein the first and second conductive plates and the third and fourth conductive plates are substantially equidistantly distributed radially around the closed loop formed by the substrate.

8. The device of claim 1:
further comprising a fifth and sixth conductive plates and seventh and eighth conductive plates;
wherein the substrate is configured to be a physically closed loop; and
wherein the first and second, third and fourth, fifth and sixth, and seventh and eighth conductive plate pairs are individually located every 45 degrees around the closed loop formed by the substrate.

9. The device of claim 1:
wherein the transceiver circuit include a tuning circuit; and
wherein the tuning circuit is configured to set a resonance frequency and a bandwidth for the electric antenna.

10. The device of claim 9:
wherein the first and second conductive plates and the third and fourth conductive plates are coupled in parallel to the tuning circuit.

11. The device of claim 9:
wherein the first and second conductive plates and the third and fourth conductive plates are switchably coupled to the tuning circuit.

12. The device of claim 9:
further comprising a switch matrix and a controller.

13. The device of claim 12:
wherein the controller is configured to command the switch matrix to selectively couple the conductive plates to the tuning circuit.

14. The device of claim 12:
wherein the controller is configured to command the switch matrix to select the conductive plates to be coupled to the tuning circuit to maximize a received signal strength (RSS) of the electric near-field signals.

15. The device of claim 12:
wherein the controller is configured to command the switch matrix to select just one set of the conductive plates to be coupled to the tuning circuit to maximize a received signal strength (RSS) of the electric near-field signals.

16. The device of claim 1:
wherein the electric (E-Field) antenna includes a plurality of conductive plate sets;
wherein the substrate includes a set of interlinked segments; and
wherein each conductive plate set in the plurality of conductive plate sets is coupled to just one of the segments.

17. The device of claim 1:
further comprising a magnetic (H-Field) antenna including a coil responsive to non-propagating quasi-static magnetic near-field signals;
wherein the magnetic antenna is configured to be coupled to the transceiver circuit.

18. A near-field device, comprising:
an electric (E-Field) antenna including a first conductive plate and a second conductive plate responsive to non-propagating quasi-static electric near-field signals;
wherein the electric antenna is configured to be coupled to a transceiver circuit;
a substrate configured to be worn by a user;
wherein the first conductive plate is located on a first side of the substrate configured to face away from the user;
wherein the second conductive plate is located on a second side of the substrate configured to face toward the user; and
wherein the substrate is configured to flexibly conform to the user.

19. The device of claim 18:
wherein the substrate is a fabric.

20. A near-field device, comprising:
an electric (E-Field) antenna including a first conductive plate and a second conductive plate responsive to non-propagating quasi-static electric near-field signals;
wherein the electric antenna is configured to be coupled to a transceiver circuit;
a substrate configured to be worn by a user;
wherein the first conductive plate is located on a first side of the substrate configured to face away from the user;
wherein the second conductive plate is located on a second side of the substrate configured to face toward the user;

wherein the electric (E-Field) antenna includes a plurality of conductive plate sets;
wherein the substrate includes a set of interlinked segments; and
wherein each conductive plate set in the plurality of conductive plate sets is coupled to just one of the segments.

* * * * *